United States Patent
Steinback et al.

(10) Patent No.: US 6,231,911 B1
(45) Date of Patent: May 15, 2001

(54) ULTRA HIGH SPEED HOT DOG INCISOR

(76) Inventors: Clarence Steinback, 5508 McGuire Rd., Edina, MN (US) 55439; Ralph S. Hodges, 941 Orange Ave., Coronado, CA (US) 92118

( * ) Notice: Subject to any disclaimer, the term of this patent is extended or adjusted under 35 U.S.C. 154(b) by 0 days.

(21) Appl. No.: 09/431,973

(22) Filed: Oct. 29, 1999

(51) Int. Cl.[7] .............................. A23P 1/00; B26D 3/08
(52) U.S. Cl. .......................... 426/518; 83/880; 83/886; 83/449; 99/537; 452/148
(58) Field of Search ................. 426/518; 99/537, 99/430, 441; 83/932, 861, 863, 864, 865, 875, 879, 886, 155, 880, 331, 332, 339, 422, 591, 449; 81/9.51; 452/30, 141, 148; 30/90.1

(56) References Cited

U.S. PATENT DOCUMENTS

| | | | |
|---|---|---|---|
| 1,291,811 | * 1/1919 | Ellis | 83/155 |
| 2,675,580 | * 4/1954 | Pesce | 452/30 |
| 2,981,971 | * 5/1961 | Zubrychi | 452/30 |
| 4,689,882 | * 9/1987 | Lorenz | 30/90.1 |
| 5,937,511 | * 8/1999 | Hoffa et al. | 29/825 |
| 6,018,876 | * 2/2000 | Hodges et al. | 30/279.2 |

* cited by examiner

Primary Examiner—Gabrielle Brouillette
Assistant Examiner—Robert Madsen
(74) Attorney, Agent, or Firm—Nydegger & Associates

(57) ABSTRACT

A device and method for incising a cylindrical shaped meat product in which a motor rotates a tubular shaped cutter housing around the longitudinal axis of the tubular housing. Inclined blades are mounted on the inner surface of the cutter housing. An injector transports the meat product into the rotating cutter housing inlet at a velocity $V_1$ and an ejector transports the incised meat product from the rotating cutter housing at velocity $V_3$. In operation, a cylindrical meat product is inserted into the injector which prevents the meat product from rotating and transports it into the rotating blades that incise a pattern of helical spiral cuts into the surface of the meat product. The action of the blades upon the meat product pushes the meat product along the longitudinal axis at a velocity $V_2$. An ejector prevents the meat product from rotating and transports the incised meat product from the cutting blades. The incising device maintains velocities $V_1$, $V_2$ and $V_3$ equal to prevent subjecting the meat product to longitudinal stresses.

20 Claims, 3 Drawing Sheets

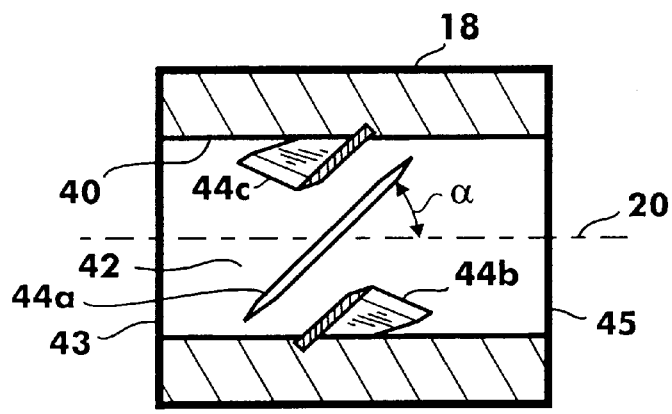
Fig. 3
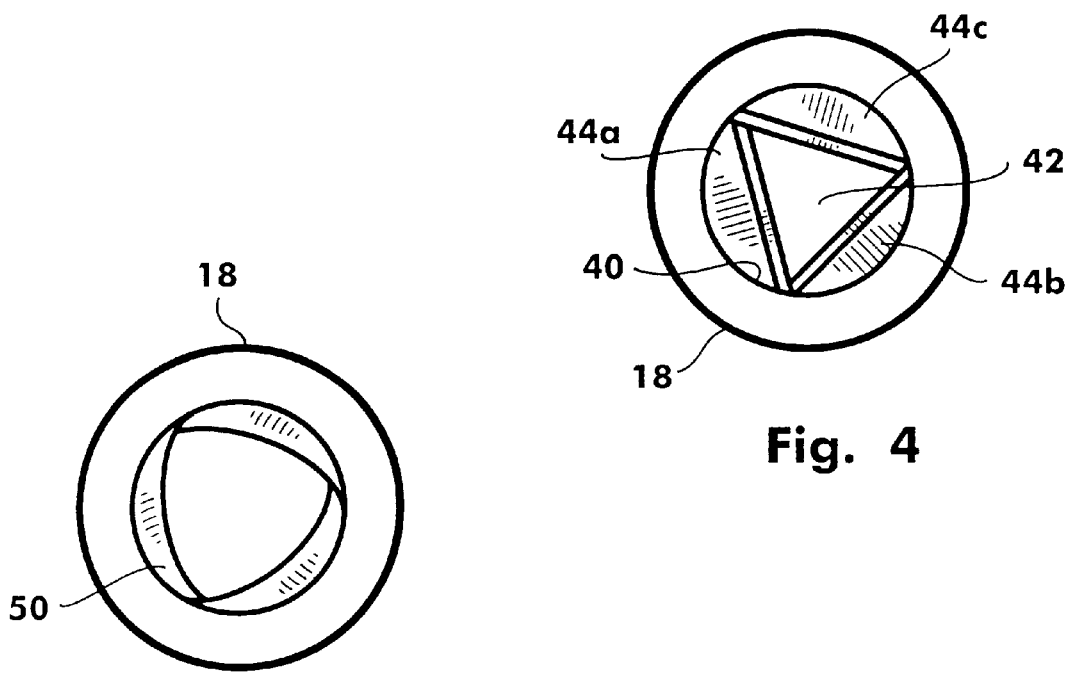
Fig. 5
Fig. 4
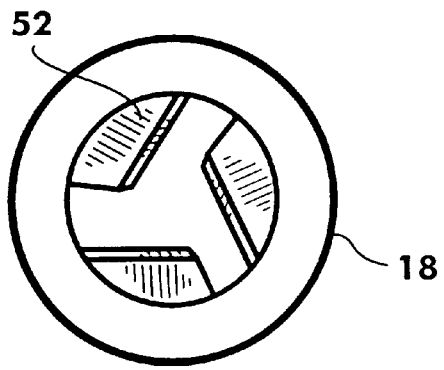
Fig. 6

ULTRA HIGH SPEED HOT DOG INCISOR

FIELD OF THE INVENTION

The present invention pertains generally to meat cutlery. More specifically, the present invention pertains to meat cutting equipment which can continuously process a large volume of pre-processed sausage-like meat products at high speed. The present invention is particularly, but not exclusively, useful for superficially incising a hot dog, or other sausage type product, with a superficial helical shaped incision which improves and enhances the taste and cookability of the product.

BACKGROUND OF THE INVENTION

In the United States, hot dogs are a well known and widely used food staple. Literally, everyone has heard of, and at one time or another has most likely eaten, a hot dog. Not so well known, however, is the fact that superficial incisions into a hot dog can have several effects on the hot dog. These effects are both practical and aesthetic.

As a practical matter, incisions into the surface of a hot dog cause the hot dog to be cooked differently than it otherwise would be. For one thing, due to the incisions, the exposed surface of a superficially incised hot dog is increased. During cooking, this increased surface area causes heat to penetrate more quickly and deeper into the interior of the hot dog. This, in turn, promotes quicker and more even cooking of the hot dog. For health reasons, these effects of superficial incision may be very desirable. Additionally, while fat in a hot dog may be desirable for taste purposes; for the diet conscious, less fat than is normally present in a hot dog may be preferable. If so, superficial incisions into a hot dog will allow fat in the hot dog to be more easily drained away as the hot dog is being cooked. The result is a leaner hot dog.

In addition to the practical considerations associated with superficial incisions into a hot dog, aesthetic considerations also come into play. For many, incisions in the surface of a hot dog can be both eye-catching and entertaining. Further, superficial incisions can make the hot dog distinctive.

For high volume production of superficially incised hot dogs, it is clear that some device or apparatus is required. It is simply too time consuming and labor intensive to manually incise each and every hot dog in a high volume operation. Moreover, for many incision designs, it is extremely difficult to insure a uniform penetration depth for the incisions when they are made by hand. A superficial helical or spiral design on a hot dog is a case in point. In order to properly make a helical or spiral shaped design into the surface of a hot dog, it is necessary to rotate the hot dog during the cutting process. All the while, the pitch of the spiral incision must be maintained constant, and the penetration depth of the cut must be uniform. Doing all of this manually in a high-volume operation can be very exacting and tiresome.

Despite the difficulties to be encountered and overcome when establishing a high volume production operation for the superficial incisions of hot dogs, the practical and aesthetic advantages to be obtained can make the effort worthwhile. Further, while the discussion thus far has specifically considered the hot dog as a candidate for superficial incisions, it is to be appreciated that any sausage-like meat is suitable for consideration.

In light of the above, it is an object of the present invention to provide a device and a method which can superficially incise prepared meat products, such as hot dogs, on a high volume basis. It is another object of the present invention to provide a device and a method for superficially incising prepared meat products with a helical or spiral design which establishes a constant pitch for the spiral pattern and which insures a uniform penetration depth for the incision. It is another objective of the present invention to incise a delicate meat product such as a hot dog or sausage at a very high speed, without deforming the round shape of the meat product or imparting cracks into the non-incised core of the meat product. Yet another object of the present invention is to provide a device for superficially incising prepared meat products which is easy to manufacture, simple to use, and comparatively cost effective.

SUMMARY OF THE PREFERRED EMBODIMENTS

A device for incising a cylindrical shaped meat product includes a tubular shaped cutter housing containing cutter blades, a drive mechanism to rotate the cutter housing about the housing's longitudinal axis, an injector to transport the meat product into the rotating cutter housing, and an ejector to withdraw the meat product from the cutter housing.

The tubular shaped cutter housing defines a longitudinal axis and is formed with a lumen that extends along the axis. The cutter housing has an inlet and an outlet which are opposite each other and respectively located at the ends of the lumen. Additionally, the cutter housing has an inner surface that surrounds and defines the lumen.

At least one cutter blade is mounted on the inner surface of the cutter housing to protrude inwardly therefrom toward the longitudinal axis of the housing. In the preferred embodiment of the present invention, three blades are mounted around the lumen of the cutter housing, and they are azimuthally separated from each other by approximately one hundred and twenty degrees. Further, each blade is inclined relative to the longitudinal axis of the housing by an angle, $\alpha$, which is in a range of approximately ten to forty-five degrees (10°–45°). Preferably, the cutter housing is made of a high strength plastic and the cutter blades are made of metal.

As indicated above, the incising device of the present invention also includes an injector to transport the meat product into the cutter housing inlet. The device also includes an ejector to transport the incised meat product from the cutter housing outlet. In the preferred embodiment of the present invention, the injector includes an elongated tube which is formed with a pair of diametrically opposed slots that are longitudinally oriented on the tube. Separate motor driven conveyor belts respectively extend into each of the slots in the injector tube. Similarly, the ejector is configured with an elongated tube formed with slots allowing conveyor belts to extend into the lumen of the ejector tube. In addition to transporting the meat product along the longitudinal axis, the conveyor belts in both the injector and ejector also restrain the meat product from rotating during incision of the meat product in the cutter housing.

In the operation of the incising device of the present invention, a meat product, such as a hot dog, is first inserted into the injector. To ensure a uniform incision of the hot dog (meat product) at the cutting stage, the conveyor belts are positioned to minimize the pressure that is exerted on the meat product. Thus, the round meat product is not substantially flattened. On the other hand, the conveyor belts of the injector need to provide sufficient pressure on the meat product to prevent the meat product from rotating during incision. Thus, the conveyor belts of the injector function to transport the meat product at a translational velocity $V_1$ through the injector tube and into the lumen of the rotating cutter housing until the meat product comes into contact with the blades of the cutter housing. In the preferred embodiment, the lumen diameter of the cutter housing is slightly larger (e.g. approximately ⅛ inch larger) than the diameter of the meat product. This dimensional difference allows for radial expansion of the meat product during incision.

As the meat product passes through the cutter housing, the rotating blades that are mounted in the housing incise the surface of the meat product. The result is a pattern of helical spiral cuts that extend along the length of the meat product. Further, because the rotating blades are inclined relative to the meat product, the action of the blades upon the meat product tends to propel the meat product along the longitudinal axis at a velocity $V_2$. Finally, the conveyor belts of the ejector engage the meat product as it exits the cutter housing to prevent the meat product from rotating. Also, the conveyor belts of the ejector transport the incised meat product from the cutter housing outlet and through the ejector tube at a velocity $V_3$. To prevent a longitudinal stress from being placed on the meat product, the device is configured so that velocities $V_1$, $V_2$ and $V_3$ are all substantially equal.

In the preferred embodiment, the cutter housing drive mechanism includes a pulley that is mounted on a drive motor and which, in turn, runs a drive belt. The drive belt, in turn, runs around the outside surface of the cutter housing to rotate the cutter housing and cutter blade(s) around the longitudinal axis. An arm is provided for moving the cutter housing from an operational incising position to a cleaning position along an arc distance from the incising position for cleaning the cutter housing. As intended for the present invention, this can be done without disengaging the drive belt from the cutter housing. Specifically, to accomplish this, the arm pivots at one end about the drive shaft of the motor and the other end of the arm is attached to the cutter housing. A bearing between the arm and the cutter housing allows the cutter housing to rotate independently from the arm, around the longitudinal axis of the cutter housing.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 3 is an enlarged elevational cross-section view of the cutter housing, alone, as seen along the line 2—2 in FIG. 1;

FIG. 4 is an end-on view of the cutter housing looking into its outlet and showing the cutting blades mounted in the lumen as seen along the line 4—4 in FIG. 1;

FIG. 5 is a view, as in FIG. 4, looking into the cutter housing outlet of the present invention showing an alternate embodiment for the cutting blades mounted in the lumen of the cutter housing;

FIG. 6 is another view, as in FIG. 4, looking into the cutter housing outlet of the present invention showing yet another embodiment for the cutting blades mounted in the lumen of the cutter housing;

DESCRIPTION OF THE PREFERRED EMBODIMENT

Figure 1:
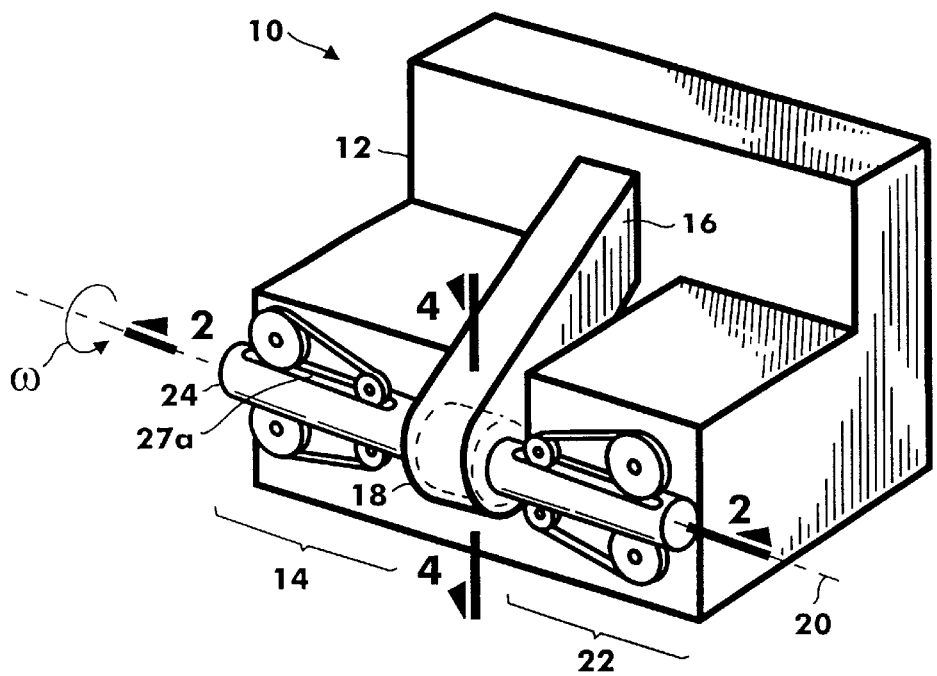
FIG. 1 is frontal perspective view of the ultra high speed incising device of the present invention with the cutter housing shown in phantom.

Referring initially to FIG. 1, a device in accordance with the present invention is shown and is generally designated 10. As shown in FIG. 1, the device 10 includes a base 12 on which are mounted an injector 14, a drive mechanism 16 for rotating a cutter housing 18 (shown in phantom) at a rotational velocity ω around a longitudinal axis 20, and an ejector 22. Both the injector 14 and the cutter housing 18 are mounted on the base 12 coaxially along the axis 20. Also, ejector 22 is located on the axis 20 and positioned to locate the housing 18 between the injector 14 and the ejector 22.

Figure 2:
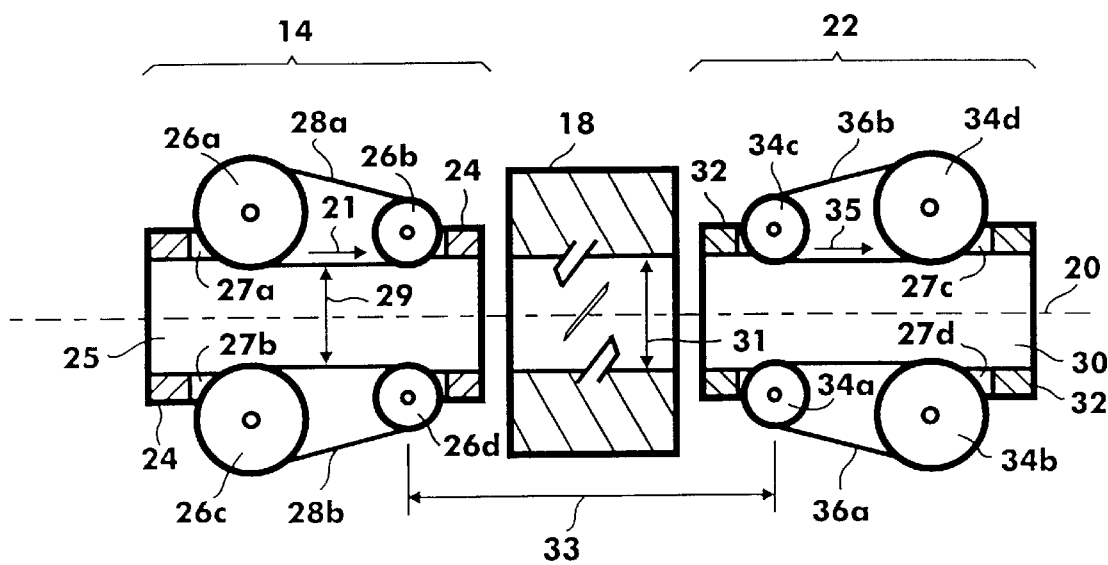
FIG. 2 is an elevational cross-section view of the incising device as seen along the line 2—2 in FIG. 1.

As shown in FIG. 1, the injector 14 includes an elongated tube 24, open at both ends, which is positioned coaxially with the longitudinal axis 20, and which is formed with a slot 27a. The slot 27a, as shown, extends generally along the length of the tube 24. As best seen in FIG. 2, protruding into slot 27a and extending into lumen 25 of tube 24 are two pulleys 26a–b. A conveyor belt 28a runs over pulleys 26a–b, passes through slot 27a, and extends into lumen 25. Similarly, slot 27b is formed on tube 24 and is diametrically opposed to the slot 27a. Protruding into slot 27b and extending into lumen 25 of tube 24 are two pulleys 26c–d. A conveyor belt 28b runs over pulleys 26c–d, passing through slot 27b, and extending into lumen 25. The distance 29 between belt 28a and belt 28b is slightly smaller than the inside diameter of tube 24. In lumen 25, belt 28a travels from pulley 26a to pulley 26b, parallel to the longitudinal axis 20, and towards the cutter housing 18 in the direction indicated by the arrow 21. Similarly, In lumen 25, belt 28b travels from pulley 26c to pulley 26d, parallel to the longitudinal axis 20, and towards the cutter housing 18.

FIG. 1 also shows that the device 10 includes the drive mechanism 16 which rotates the cutter housing 18 (shown in phantom) around longitudinal axis 20. As shown in FIG. 2, cutter housing 18 is located adjacent to the injector tube 24 and is coaxial with the injector tube 24. An enlarged cross-sectional view of the cutter housing as seen along line 2—2 of FIG. 1 is shown in FIG. 3.

As will be appreciated by cross-referencing FIG. 1 with FIG. 3, the cutter housing is open at both ends, and is preferably made of high strength plastic. With its tubular configuration, the cutter housing 18 has an inner surface 40 that surrounds and defines a lumen 42 which extends through the cutter housing 18 along its entire length from an inlet 43 to an outlet 45. As shown, the cutter housing 18 of the present invention includes at least one cutting blade 44. Although the cutter housing 18 will preferably have three metal blades 44, such as blades 44a–c shown in FIG. 4, it will be appreciated that more or fewer blades 44 can be used as desired. Three blades 44a–c that are azimuthally separated by approximately one hundred twenty degrees is preferred because this configuration keeps the meat product centered within the cutter housing 18.

FIG. 4 is an end-on view of the cutter housing as seen along the line 4—4 in FIG. 1. By cross referencing FIGS. 3 and 4 it will be appreciated that the cutter blades 44 are mounted on the inside surface 40 of cutter housing 18, to protrude inwardly into the lumen 42. Additionally, with specific reference to FIG. 3, it will be seen that the cutter housing 18 defines a longitudinal axis 20, and that all of the blades 44a–c are inclined at an angle, α, relative to the axis 20. For purposes of the present invention, the angle α is preferably in a range that is between approximately ten and forty-five degrees (10°–45°).

FIGS. 5 and 6 show alternate embodiments of the cutter housing as seen along the line 4—4 in FIG. 1. Specifically, the alternate embodiments incorporate variations of the blades 44. In FIG. 5, it will be seen that the incising device 10 can incorporate curved blades 50. In FIG. 6, it will be seen that the incising device 10 can incorporate shortened blades 52. It will thus be appreciated that various arrangements of blades 44, 50 or 52 can be employed and that various numbers of blades can be used in any one incising device 10.

Returning to FIG. 2, it can be seen that the ejector 22 includes an elongated tube 32 which is open at both ends, and which is positioned coaxially with longitudinal axis 20. Also, the ejector tube 32 is formed with a slot 27c which extends generally along the length of the tube 32. As best seen in FIG. 2, protruding into slot 27c and extending into lumen 30 of tube 32 are two pulleys 34c–d. A conveyor belt 36b runs over pulleys 34c–d and passes through slot 27c to extend into the lumen 30. Similarly, there is a slot 27d which is formed on tube 32 and is diametrically opposed to slot 27c. Protruding into slot 27d and extending into lumen 30 of tube 32 are two pulleys 34a–b. A conveyor belt 36a runs over pulleys 34a–b, passes through slot 27d, and extends into lumen 30. The distance between belt 36a and belt 36b is slightly smaller than the inside diameter of tube 32. In lumen 30, belt 36a travels from pulley 34a to pulley 34b, parallel to the longitudinal axis 20, and away from the cutter housing 18 in the general direction of the arrow 35. Similarly, In lumen 30, belt 36b travels from pulley 34c to pulley 34d, parallel to the longitudinal axis 20, and away from the cutter housing 18.

Figure 7:
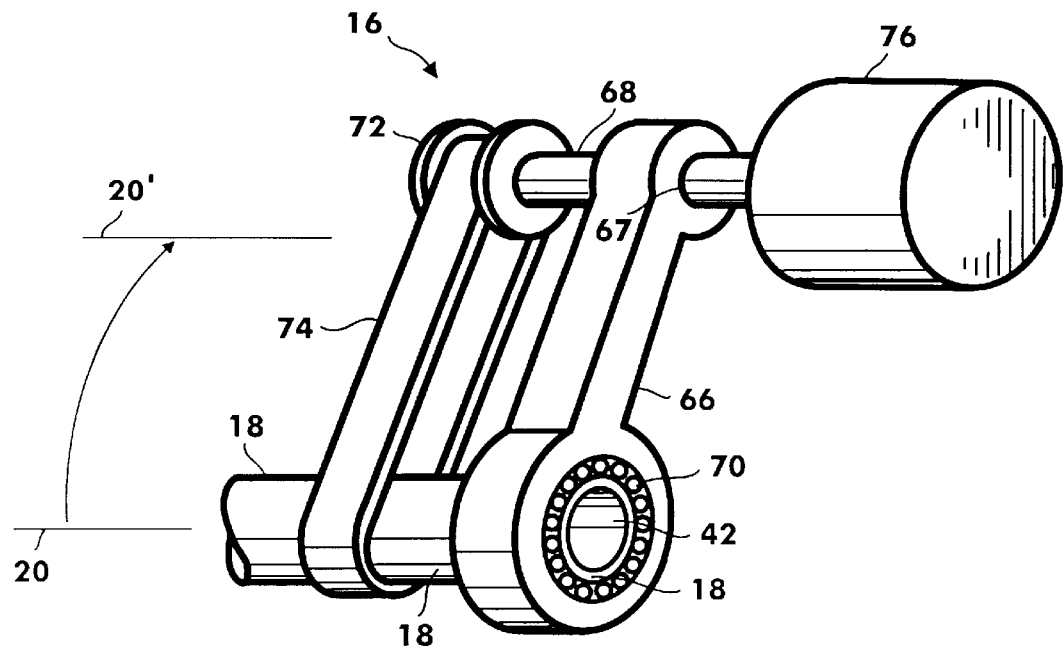
FIG. 7 is a frontal prospective view showing the drive mechanism for rotating the cutter housing.

As shown in FIG. 7, in the preferred embodiment, the drive mechanism 16 includes a pulley 72 which is mounted on driveshaft 68 of drive motor 76. Pulley 72 runs a drive belt 74, that, in turn runs around the outside surface of cutter housing 18 to rotate the cutter housing 18 around longitudinal axis 20. An arm 66 is provided that facilitates moving the cutter housing 18 to a second position along an arc to axis 20' for cleaning, without requiring disengagement of drive belt 74 from the cutter housing 18. To accomplish this, one end of arm 66 pivots about drive shaft 68 of motor 76 and the other end of arm 66 is attached to the cutter housing 18. Thus, drive shaft 68 spins freely in lumen 67 of arm 66. A bearing 70 between arm 66 and cutter housing 18 allows cutter housing 18 to rotate independently of arm 66 around longitudinal axis 20.

Operation

Figure 8:
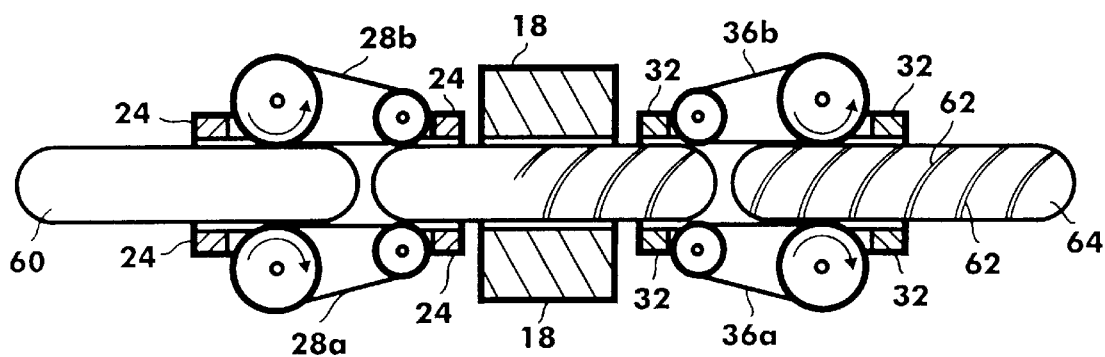
FIG. 8 is an elevational cross-section view of the incising device as seen in FIG. 2 shown in its operation for cutting spiral incisions into the surface of a meat product.

By cross referencing FIGS. 2, 3 and 8 the operation of the incising device 10 can be seen. First, a meat product such as a hot dog is selected. The meat product 60 is inserted into the injector tube 24 until the meat product 60 contacts conveyor belts 28a–b. A drive motor (not shown) rotates pulleys 26 that then run belts 28a–b. It is to be appreciated by one skilled in the art that a single drive motor can be used to drive the injector pulleys, the ejector pulleys and rotate the cutter housing. Pulleys 26a–d are configured so that the distance 29 between conveyor belts 28a and 28b is only slightly smaller than the diameter of meat product 60. When the proper distance 29 is obtained, substantial flattening of meat product 60 does not occur, yet the meat product is held firmly enough to prevent rotation in response to the rotating action of the blades. Conveyor belts 28a–b transport meat product 60 along the longitudinal axis 20 at a velocity $V_1$ into lumen 42 of the rotating cutter housing 18 until the meat product 60 comes into contact with the blades 44. The distance 33 along longitudinal axis 20 between the point where belt 28b first contacts pulley 26d and the point where belt 36a makes last contact with pulley 34a is less than the length of meat product 60. This allows the meat to always be in contact with either an injector belt 28 or an ejector belt 36 during incising, and hence rotation of the meat product is always prevented during incising. Cutter housing lumen diameter 31 is approximately ⅛ inch longer than the initial meat product diameter, to allow for a slight radial expansion of meat product 60 that occurs during operation. The rotating blades 44 incise the surface of the meat product 60 resulting in a pattern of helical spiral cuts 62 that extend along the length of the meat product 60. Because the rotating blades 44 are inclined at an angle α relative to the meat product 60, the action of the blades 44 upon the meat product 60 as the cutter housing 18 is rotated at an angular velocity ω (shown in FIG. 1) tends to push the meat product 60 along the longitudinal axis 20 at a velocity $V_2$ into the ejector tube 32.

The incised meat product 64 is pushed by the rotating cutter housing at a velocity $V_2$ into ejector tube 32 until the incised meat product 64 contacts conveyor belts 36a–b. A drive motor (not shown) rotates pulleys 34 that, in turn, run belts 36a–b. Belts 36a–b prevent the incised meat product 64 from rotating and transport it along the longitudinal axis 20 at a velocity $V_3$ from the cutter housing outlet 45. Importantly, to prevent a longitudinal stress from being placed on the meat product, the incising device 10 is configured so that velocities $V_1$, $V_2$ and $V_3$ are all substantially equal.

One skilled in the art would recognize that other configurations would be suitable such as a configuration where the meat product is held stationary and a rotating cutter housing is passed over the meat product thereby incising it. Likewise, the cutter housing could be held stationary and the meat product simultaneously rotated and passed through the housing thereby incising the meat product.

While the particular Ultra High Speed Hot Dog Incisor as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A device for superficially incising a sausage-like meat product which comprises:
   a base;
   a tubular shaped cutter housing formed with a lumen for receiving a cylindrical shaped meat product therethrough, said cutter housing having an inlet and outlet, and having an inner surface and outer surface, said cutter housing also defining a longitudinal axis;
   at least one cutting blade mounted on said cutter housing to protrude from said inner surface toward said axis, said cutting blade having a first end and a second end with said cutting blade inclined at an angle α relative to said longitudinal axis with said first end of said cutting blade being closer to said cutter housing inlet than said second end of said cutting blade;
   a motor mounted on said base for rotating said cutter housing around said longitudinal axis;
   an injector mounted on said base for injecting the meat product into said housing inlet; and
   an ejector mounted on said base for withdrawing the incised meat product from said cutter housing outlet.

2. A device as recited in claim 1 wherein said cutting blade is inclined at an angle α relative to said longitudinal axis, and α is in a range of from approximately ten degrees to approximately forty five degrees (α=10°–45°).

3. A device as recited in claim 2 further comprising a plurality of said cutting blades and wherein said angle α for each said respective cutting blade has a same value.

4. A device as recited in claim 1 comprising three said cutting blades.

5. A device as recited in claim 4 wherein said cutting blades are azimuthally separated from each other by approximately 120°.

6. A device as recited in claim 5 wherein all said cutting blades extend a radial distance into said lumen, and wherein said radial distance for each said cutting blade is substantially the same.

7. A device as recited in claim 1 wherein said injector comprises:
an elongated tube having a lumen for receiving the meat product therethrough, said tube being formed with a first slot extending lengthwise along said tube and a second slot extending lengthwise along said tube, said first slot being substantially diametrically opposed to said second slot;
a first conveyor belt extending into said lumen through said first slot;
a second conveyor belt extending into said lumen through said second slot to engage the meat product between said first conveyor belt and said second conveyor belt; and
a drive means for moving said first conveyor belt and said second conveyor belt in said lumen to transport the meat product through said injector and along said longitudinal axis at a velocity $V_1$.

8. A device as recited in claim 7 wherein said means for rotating said cutter housing and said cutting blades move the meat product along said longitudinal axis at a velocity $V_2$ and wherein said ejector comprises:
an elongated tube having a lumen for receiving the meat product therethrough, said tube being formed with a first slot extending lengthwise along said tube and a second slot extending lengthwise along said tube, said first slot being substantially diametrically opposed to said second slot;
a first conveyor belt extending into said lumen through said first slot;
a second conveyor belt extending into said lumen through said second slot to engage the meat product between said first conveyor belt and said second conveyor belt with said drive means moving said first conveyor belt and said second conveyor belt in said lumen to transport the meat product through said ejector along said longitudinal axis at a velocity $V_3$, wherein $V_1$, $V_2$ and $V_3$ are substantially equal.

9. A device as recited in claim 8 wherein said means for transporting the meat product into said cutter housing and said means for transporting the meat product from said cutter housing are driven by said motor.

10. A device as recited in claim 1 further comprising a means for moving said cutter housing to a position wherein said cutter housing can be cleaned.

11. A device for superficially incising a cylindrical shaped meat product, the meat product defining a longitudinal axis, and said device comprising:
a cutting element for incising the meat product, said cutting element being rotatable about said axis relative to the meat product and engageable therewith to translate the meat product along said axis at a relative translational velocity V while incising the meat product;
a motor for rotating said cutting element about said axis;
means for advancing said meat product into said cutting element at substantially said translational velocity V; and
means for withdrawing said meat product from said cutting element at substantially said translational velocity V.

12. A device as recited in claim 11 wherein the translational velocity of the meat product is V, the rotational velocity of the meat product about said axis is substantially zero, the translational velocity of said cutting element along said axis is substantially zero, and the rotational velocity of said cutting element about said axis is $\omega$.

13. A device as recited in claim 11 wherein said cutting element comprises a tubular shaped cutter housing formed with a lumen for receiving the meat product therethough, said cutter housing having an inner surface, and at least one cutting blade mounted on said cutter housing to protrude from said inner surface toward said axis, said cutting blade having a first end and a second end with said cutting blade inclined at an angle $\alpha$ relative to said longitudinal axis with the said first end of said cutting blade being closer to said cutter housing inlet than said second end of said cutting blade.

14. A device as recited in claim 11 wherein said means for advancing the meat product into said cutting element at said relative velocity V comprises an injector and wherein said means for withdrawing said meat product from said cutting element at a relative velocity V is an ejector.

15. A device as recited in claim 14 wherein said cutting blade is inclined at an angle $\alpha$ relative to said longitudinal axis, and $\alpha$ is in a range of from approximately ten degrees to approximately forty five degrees ($\alpha=10°–45°$).

16. A device as recited in claim 15 further comprising a plurality of said cutting blades and wherein said angle for each said respective cutting blade has a same value.

17. A device as recited in claim 13 comprising three said cutting blades.

18. A method for superficially incising a sausage-like meat product which comprises the steps of:
providing a device having a base, a tubular shaped cutter housing formed with a lumen for receiving a cylindrical shaped meat product therethrough, said cutter housing having an inlet and outlet, and having an inner surface and outer surface, said cutter housing also defining a longitudinal axis, at least one cutting blade mounted on said cutter housing to protrude from said inner surface toward said longitudinal axis, said cutting blade having a first end and a second end with said cuffing blade inclined at an angle $\alpha$ relative to said longitudinal axis with the said first end of said cutting blade being closer to the cutter housing inlet than said second end of said cutting blade, a motor mounted on said base for rotating said cutter housing around said longitudinal axis, an injector mounted on said base for injecting the meat product into said cutter housing inlet; and an ejector mounted on said base for withdrawing the incised meat product from said cutter housing outlet;
inserting a meat product into said injector;
advancing the meat product into said cutter housing; and
extracting the meat product from said ejector.

19. A method as recited in claim 18 wherein said cutting blade is inclined at an angle $\alpha$ relative to said longitudinal axis, and $\alpha$ is in a range of from approximately ten degrees to approximately forty five degrees ($\alpha=10°–45°$).

20. A method as recited in claim 18 wherein the device comprises three said cutting blades and wherein said angle for each said respective blade has a same value.

* * * * *